(12) United States Patent
Crowl

(10) Patent No.: US 7,870,067 B2
(45) Date of Patent: Jan. 11, 2011

(54) DONATION SYSTEM

(76) Inventor: Thomas C. Crowl, 12101 El Oro Way, Granada Hills, CA (US) 91344

(*) Notice: Subject to any disclaimer, the term of this patent is extended or adjusted under 35 U.S.C. 154(b) by 54 days.

(21) Appl. No.: 12/042,801

(22) Filed: Mar. 5, 2008

(65) Prior Publication Data

US 2008/0319898 A1 Dec. 25, 2008

Related U.S. Application Data

(60) Provisional application No. 60/945,509, filed on Jun. 21, 2007.

(51) Int. Cl.
*G06Q 40/00* (2006.01)
(52) U.S. Cl. ............... 705/39; 705/1; 705/14; 705/36; 705/35
(58) Field of Classification Search ........... 705/1, 705/39, 14, 36, 35, 40, 30, 10; 210/767; 700/90; 434/323, 350
See application file for complete search history.

(56) References Cited

U.S. PATENT DOCUMENTS 6,092,052 A * 7/2000 Ziarno ................ 705/21
2006/0059070 A1* 3/2006 Petruck ................ 705/35

* cited by examiner

*Primary Examiner*—Mary Cheung
*Assistant Examiner*—John H Holly
(74) *Attorney, Agent, or Firm*—Michael L. Greenberg, Esq.; Greenberg & Lieberman, LLC

(57) ABSTRACT

A donation system that would encourage registered individuals to make small contributions to a charity or political campaign (or cause of their choice) as well as facilitate the process of doing so. The system provides a central location for all donation activity and works as a "contribution bundler" to empower those otherwise disempowered in the political marketplace. The system also acts as a "Civic Marketplace" that gives citizens a central location to turn to for civic information. The system provides safety features for registered users.

12 Claims, 1 Drawing Sheet

DONATION SYSTEM

This is a non-provisional application claiming priority to provisional patent application No. 60/945,509 filed on Jun. 21, 2007

FIELD OF THE INVENTION

The present invention incorporates a non-partisan political and cause based donation system that satisfies all accounting and reporting requirements through a single account. This donation system acts in conjunction with certain other non-partisan civic, political, commercial and charitable functions that combine to create an effective "Civic Marketplace."

BACKGROUND OF THE INVENTION

Although there are many places and ways that provide individuals with the opportunity to support a candidate, a cause, an issue or a charity, we are still faced with a situation where the vast majority feels both disconnected from their community and government, and utterly impotent to compete against "the big guys". This perception affects society in various aspects, including, but not limited to: reduces in voter turnout and increased feelings of apathy that may lead to_ frustration, which results in bad government. There is a dominance of large money in our political system that is frustrating to many individuals who feel that their individual contributions do not make a difference. Also, due to transaction costs, it is ultimately not profitable to solicit or receive the small donations that the average person is able to contribute. This leads to a disconnect between public affairs and the individual opinion because the general public feels that the amount of money they are able to contribute will impact how much weight their opinion will carry. Furthermore, the amount of legalities and "red tape" that go into contributing to a political cause can discourage an individual who would be an active donor otherwise.

There are a number of places one can go to support a campaign or minor charity as well as many systems that use escrow accounts to transfer money online as illustrated in the following relevant patents.

U.S. Pat. No. 6,898,575 issued to Mull on May 24, 2005 is a system and method for online charitable donations between donors and recipients. While it acts as a go-between for donors and recipients, it does not provide the incentive other than goodwill. Unlike the present invention, there is no source of motivation.

U.S. Pat. No. 6,223,169 issued to Mori et al. on Apr. 24, 2001 is an electronic processing system for transferring a monetary value between and payer and a receiver. However, unlike the present invention this system contains neither an aggregative nor a motivational component.

Various Web sites that engage in this relevant subject matter also do not match the unique aspects of the present invention. For example, SNOCAP.COM focuses on small transactions in conjunction with individual artistic rights and music connections. Thus, SNOCAP.COM is vastly different from the present invention in terms of the aggregative and motivational component. This also means that SNOCAP.COM does not employ such additional items as publishing and localizing donations based on geographical locations. This includes CHARITYNAVIGATOR.ORG and other like Web sites.

Unlike the present invention, none of these endeavors facilitate the unified accounting and reporting practices as the present invention, particularly in the not-for-profit area. Moreover, these Web sites differ from the present invention in that their Web sites are owned by the same non-profit organization where donation, unified accounting mechanisms and reporting are not possible. Other Web sites with buttons, meanwhile, merely link back to a charity's own site. Political opinion Web sites also do offer some networking opportunities for their users but only the present invention conceives to offer networking opportunities specifically aligned with various geographically-based jurisdictions such as electoral districts in a non-partisan and transparent manner. In addition, only the present invention combines this aspect with its other described attributes.

It also should be noted that the present invention solves a fundamental problem relating to the donation process. For example, most political candidates utilize Web sites to solicit donations. In addition to Web sites, many political organizations also solicit donations. However, these political candidates and organizations must act, solicit and report all donations within the confines of jurisdictional election requirements. This is why nearly every online donation solicitation attempts to guide potential donors to provide $10 at a minimum on up to the maximum legal amount permitted to be donated. The reality is that it would be more costly for a political candidate to cover the administration costs of a relatively tiny donation of, say 50 cents for example. The present invention solves this problem by maintaining the ability to report all these individual donors within the law while making these small donations worthwhile in terms of administration costs.

Thus there is a need for a "Civic Marketplace". Although such Marketplace shall provide a space for opinion and information, it must also ensure individuals, that if they contribute financially, their voices will be heard. Reinforcers such as feedback showing individuals how their contributions are making a difference, will assure that individuals feel more connected to the organizations (ie. Charities, political organizations), after they decide to donate.

There is a need for a system that could
1. fulfill reporting requirements for multiple causes with a one-time registration
2. collect the donations that individuals can contribute to a cause/candidate and aggregate them into a large sum that would require only one transaction.

This would benefit both donor and recipient. The recipient would receive more donations and therefore more money. The various non-profit organizations would have one central site to solicit donations from relevant donors. Take, for example, a neighborhood park that is in dire need of a new swing set. Such a system would allow the park committee to solicit donations from people in the community who have a vested interest in that park. There are huge advantages for small and local charities that can use this vehicle to advertise to local audiences and centralize collection of these donations. The donors to these various organizations would be able to see how their donation contributed to a large sum, have a sense of empowerment, and be encouraged to be active in public affairs. In turn, political candidates then can act accordingly after reviewing the donation information provided through the present invention.

SUMMARY OF THE INVENTION

The present invention is especially useful to encourage public participation in local, national, and worldwide politics and is intended for use by anyone who has access to the Internet. This invention provides a central site in which individuals can view multiple relevant recipient organizations and easily make small contributions to an organization of their choice.

The present invention acts as both a donation system and a "civic marketplace" that provides a central location for citizens to donate to various non-profit groups (such as charities and political candidates), as well as voice their opinion and interact with other individuals on a variety of geographical levels.

BRIEF DESCRIPTION OF DRAWINGS

The invention will be better understood and objects other than those set forth above will become more apparent when consideration is given to the following detailed description thereof. Such description makes reference to the annexed drawings wherein.

DETAILED DESCRIPTION OF THE INVENTION

Figure 1:
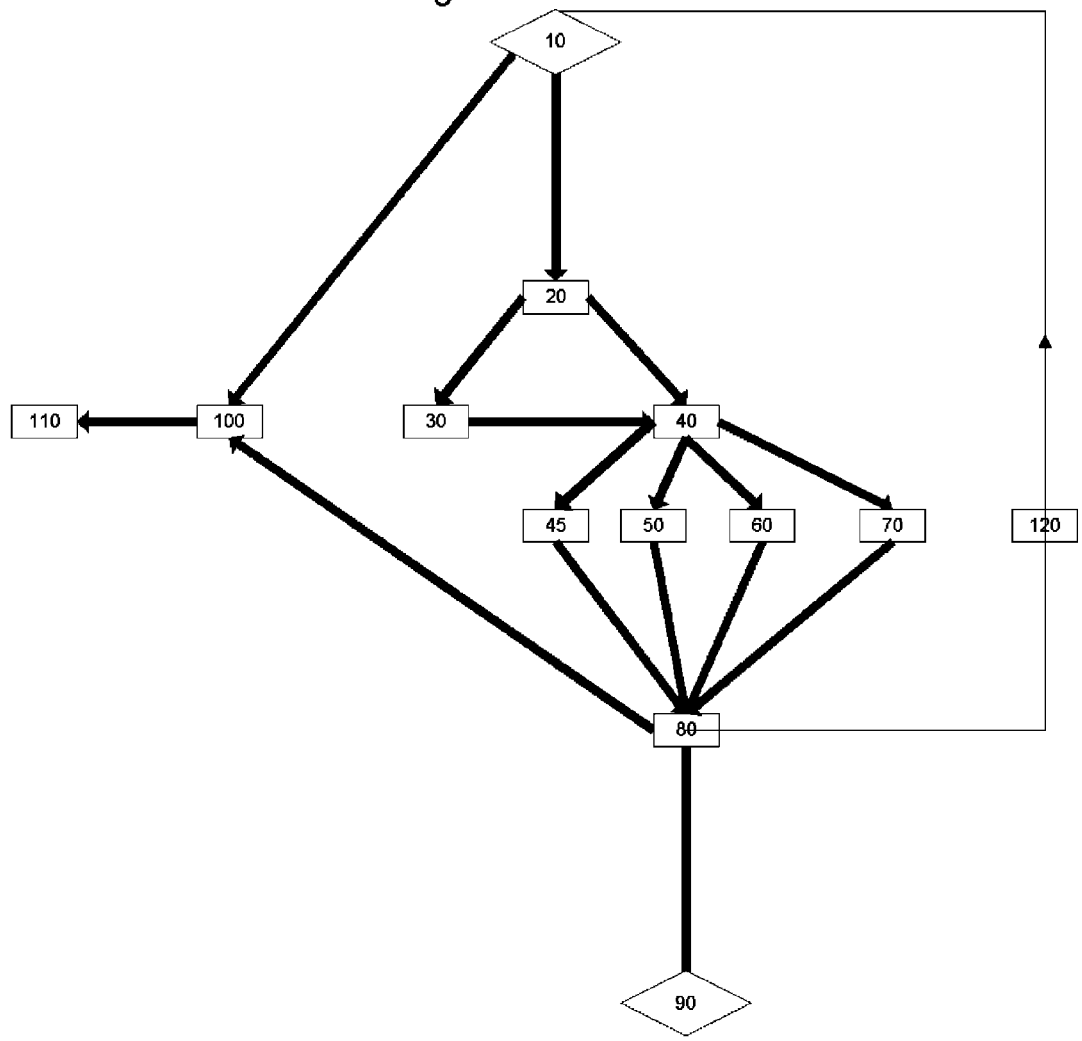
FIG. 1 is a flowchart of the method of the present invention

The present invention is intended for use by anyone who has access to the Internet, particularly someone who has a home computer with Internet access. These individuals are most likely to return on a regular basis and benefit from the convenience of the donation system.

The present invention contains a database component to log all monetary transactions that take place, a motivational component which encourages both donors and recipients to hold and actively use an account, and a feedback element that allows users to observe the invention's purpose and ensure their continued use.

The donation database will keep track of all money donated from a donor to a recipient. All information pertinent to reporting requirements for candidate donations will be included in the one-time registration that would be required before individuals could be active donors. Once a user is registered, he/she can donate to a charity or political candidate (no donation is too small), or recipient group of choice. Additional funds can be added to an account at any time. All donations can conveniently be submitted and tracked through an individual's home computer. Individual identity is isolated from other data used in analysis, and the user can feel secure that individual identifiers are used ONLY for the accounting requirements and the reporting requirements of certain kinds of donation. The donation system provides a convenient single account in which a user can donate to any recipient group of their choice and provides the donor with all necessary tax reporting documents conveniently. This is an inducement for donors to perform their donation activity through this single site, and therefore also acts as an inducement for recipients to register.

The present invention includes internal systems, which keep track_of the multiplicity of election donation limits and reporting requirements, can provide alerts to donors if they are approaching a limit through this account, and restrict identifying information transferred to the recipient to what is legally required in individual jurisdictions.

The system of the present invention has several features to ensure its continued use by users and recipients of all kinds. The system would have tabs to organize recipient accounts. Said tabs would be assigned according to neighborhood, local, state, and national tabs.

The Neighborhood is the smallest geographically localized "Tab" on the website. A mosaic of all these "Tabs" would be a contiguous blanket across the U.S. The Neighborhood "Tab" should include the number of households that an anthropologist might call "a natural human community size." Although, it is difficult to decide on an exact number, such size should reflect the idea of what a reasonable person would designate as establishing their own identity, being known by, and knowing, most other community members. It may not precisely conform to zip codes though in some cases it might. In other words, in actual practice the neighborhood community we must "serve" here is the "Using community" as opposed to the potentially using community. So in the growth process of this online civic marketplace, while your "theoretical neighborhoods" may have been established from day one and assume a certain level of market penetration, in practice there will be no "community" there on day one. (There are concrete steps for how this is handled during growth).

As usage grows, your "practical" neighborhoods shrink. When the "practical" neighborhoods approach in size the "theoretical" neighborhoods" you begin to see much, much greater effects at the local level. It is finally here that you know that your online "neighborhood" is truly a collection of people with different opinions who live quite close to you. In other words, the neighborhood tab will evolve as more people register for the donation system. As more people sign up, the neighborhood tab will be able to be more localized. For example if many people in your city are not using the donation system then the neighborhood tab might include several cities including yours so that there are meaningful numbers that correspond to the neighborhood tab. Also for example, if many people in your city are using the donation system then the neighborhood tab might include only the donation data from your actual street.

Each user will be placed in these geographical groups based on their provided registration information. Each tab would provide an area where recipients could advertise their cause to the appropriate audience. Donors would only receive information and advertisements for recipient groups that are relevant to them. Registered users would also be able to get statistical breakdowns of recipient group support based on their geographical location.

The geographic breakup of registered users allows the donation system to act as a "civic marketplace". The system not only provides a convenient place to donate to various recipients, but a convenient place a citizen can go to obtain civic information. Civic information would include, but is not limited to, information about government functions and government contact numbers. All of this information is available elsewhere, but this combines it into one convenient location.

Recipient groups are encouraged to register an account with the donation system because of tools such as targeted ad space. These would be areas that a recipient group could use to post an ad or a short video clip endorsing their cause. Large companies could also use these ad spaces to advertise sponsorship deals with particular recipients. To illustrate this point, assume Toyota wants to gain some positive publicity. Toyota could advertise a deal on the donation system's homepage stating that for the next month any contribution to a charitable organization enters the donor into a drawing to win a new car. This presents a win-win situation for all parties involved. These ad spaces are also available to local groups for announcing local events, meetings, etc. Since the system would be non-partisan, it would quickly gain popularity over partisan donation sites due to its broad user base.

Other User tools are the Soapbox and Suggestion box features that are included under all tabs up to the national level. These would provide opportunities for account holders to sound-off on public issues of their choice. These boards would be filtered in a non-biased, non-partisan way to avoid becoming a junkyard of unrelated remarks. The evaluation process for how comments and suggestions are selected to move up to larger tabs are actually conducted by the Users through a rating process. These boards provide an incentive for all types of users to visit the Nation Tab and state Tabs regularly to see a selection of comments even if they do not wish to make a donation. They will find a user-written, user-edited National Opinion Page and State Opinion Pages compiled from lower levels.

Also included are various web-based communication technologies such as an email system, instant-messaging system, voice systems, online meeting systems, virtual-reality spaces, etc all designed to facilitate association building and opinion sampling.

A unique and essential motivational component of the donation system is its use during live political events, such as candidate debates. There will be an element included in the invention for a fixed time period contest between two or more contestants (i.e. candidates) that would occur simultaneously with the live event itself. These contests would have fixed rules that would only apply during the contest time. All donors who participate would start out with a monetary limit (e.g. five dollars) and can make a pledge in equal small increments (e.g. 50 cents) to one or more contestants throughout the live contest. Pledges would be publicly displayed in real time and in graphic form showing each contestant's actual pledges moment by moment. An individual could observe in real time how a candidate's pledges increase after a particular rebuttal. This would allow an individual to keep track of his/her contestants and donate accordingly. It provides the monetary incentive that opinion polls simply do not possess. It also provides a feeling of immediate gratification that will encourage the use of the donation system. Due to the equal increment and equal limit rules, all users would feel that their vote was equal to anyone else's and provides the egalitarian feel that is missing in politics today.

The "sporting component" of the live contest function is another important motivator. Due to the large amount of media attention that events such as political debates receive, these contests provide an ideal time for the donation system to gain popularity. The media loves to report scores, especially scores with monetary value. At the completion of a contest the media report would provide information regarding the results of that contest which will result in all candidates, as well as the party in general, encouraging supporters to participate and use the donation system for the next debate. This "sporting" component is a very effective human motivator; nobody likes to lose. Thus the media reporting will ensure the growth and continued use of the donation system.

The live contest function is a great way to illustrate the feedback component of the invention. A user who actively participated in the live contest can observe the contestants behavior post-live contest, and see how their behavior reflects the contest results. Again, since all users were on equal footing during the contest, all users should feel that their voice had an equal impact.

The live function rules also create a unique data set in multiple ways since it represents "dollar votes" not simply "preference" votes from a self-selected population, each voter has multiple votes, and all voters are basically equal in "vote power." And most especially there is unique additional data accompanying each "vote" or "Data Point." It is a data set of very likely voters with advantageous characteristics for analysis available nowhere else.

Each data point contains within it information such as individual natural person identity specifics for reporting purposes, geographic location, that account's past voting patterns, past voting frequency, past voting amounts (both within and outside of events), account charity giving patterns, charity giving frequency, charity giving amounts. If they signed up through work we will know area of employment. We also may have past search patterns, past ad clicking patterns, past shopping patterns. If, at sign up, Donor account holder supplies optional information we may also have age, income bracket, ethnic background, party affiliation, education level, other optional information which could be asked for (with assured privacy rights regarding its use). There is also a distinction between a "pledge" and a "donation" within the live event rules. This means that within time limits a donor can rescind his vote, which can add valuable information to the data set. And then of course, we have the specific time, the specific moment in which the "vote" is cast and its relation to what's going on in the live event.

This feature acts not only as a motivator for growth but a unique source for opinion analysis. The Live Event Features are also available for local candidates, third party candidates, causes, charities, special disaster relief events, etc. Further, with the live event special feature there may be sponsorship agreements with corporate or other interests for goodwill and advertising benefit.

The present invention offers incentive to various levels of users and utilizes this to draw in its consumer base. The site would be open to the general public and could be accessed by anyone who happened to "stumble" upon it. If that person found the site intriguing, but still wished to remain anonymous, a low level anonymous account could be activated requiring only an email and a password. These accounts would be able to view civic information as well as local and national message boards, but would not be able to donate to recipients or post on message boards. Once further involved in the donation system, an identified account could be established in which the user must register personal identification information in order to be an active donor on the system. Registered donors have access to all the tools offered by the donation system. By offering multiple levels of participation, the user will be drawn in without the immediate put-off of a lengthy registration.

The present invention includes protection against fraud along with other safety features. During a live contest such as a debate, there will be a built-in time delay between pledge and donation (actual fund transfer). Once a pledge is made an email will be sent out to the individual and that individual will have a short amount of time to confirm or rescind the pledge. If no action is taken in that time period, the pledge will become a donation automatically. This would provide a guard against fraud. This invention will also watch for significant spikes in donations and other statistical aberrations and trigger an escrow hold until reasons can be determined. This will notify an accountholder if any unusual activity has taken place in their account and provide additional safety. Recipient/Registrant status is available to all IRS recognized tax-exempt and non-tax exempt non-profits and all legally recognized candidates at all levels upon fulfillment of the donation system's security requirements. This is to ensure that an individual does not sign up with a bogus recipient account in order to obtain donations for his/her own personal interest.

Transparency, accountability and neutrality are all essential elements of this "civic marketplace." As such other methods both technical and human are essential to secure these qualities and will be included. Independent oversight by Users and Others is both expected and necessary.

The present invention acts as an intermediary between registered donors and registered recipients as FIG. 1 illustrates. Recipients could include any non-profit organizations such as political candidates or charitable organizations, whereas donors could include any natural person. The registration information from a donor (10) would be sent over a secure site and saved in a recognition database (20). The donor (10) would be prompted for a username and password for any future log-ins. This information would be processed through the recognition database (20) before successful login could occur. The user will then be directed to a page displaying their current account information (30) such as recent donations, the user's remaining balance. This site will be linked to a homepage (40) that contains news information relevant to their preferred charities and political candidates as well as links to a neighborhood page (45), a local page (50), a state page (60) and a national page (70). Each donor's (10) local page (50) would contain information pertinent to the donor's (10) location of residence. Local political candidates and small neighborhood charities are just two examples that embody this idea. The state page (60) is where donors (10) would go to locate recipients at the state level, and the national page (70) is where a donor (10) would go to locate a larger charity or a national political candidate. A donor (10) could make a donation to any of these candidates by following a link to a donation page (80). The subsequent donation would then be transferred to a recipient (90). The donation system will keep track of all "micro-donations" given to each candidate, and will aggregate the donations into a lump sum. This lump sum is submitted to the recipient (90) with only one transaction fee. Registered recipients are free to use resources such as advertising/campaigning space that is available on any of the aforementioned pages.

If a donor (10) chooses to donate to a recipient (90), the donation will be sent to a reporting database (100), placed in an escrow account, and transferred to the recipient (90). All transactions are placed in the reporting database (100) and reports and statistics will be accessible to the public (110). This will include graphical representations of recipient (90) support.

The following is only one embodiment of the process of the present invention. Let's take the case of a publicized political debate between two presidential candidates. Specific rules will go into effect for contests such as these. The Donor (10) is a registered user who wishes to contribute to the candidate of their choice during the debate. The Donor (10) logs into the system and his login information is passed through the recognition database (20). The network will keep track of all transactions between donor (10) and recipient (90) and real time updates will be displayed that will report the amount of support going to each candidate from all users. If a candidate gives a particularly clever response, a user is encouraged to donate. At any point during this real time "contest" users will be able to see how much support their chosen candidate is getting compared to the other candidate(s) and will be encouraged to donate accordingly. At the end of the debate, all registered users will receive an email with the results, displayed graphically, that the reporting database (100) logged.

As the FIGURE and description convey, the present invention is a donation system that relates to the efforts of multiple donors, also referred to as a first donor, individual donors and other donors. In essence, the present invention accommodates the needs of both ardent political activists as well as casual and even "bandwagon" political candidate supporters. What happens is that potential donors may only wish to donate a tiny amount of money to a candidate. This actually causes more problems for the candidate because the candidate may have to incur higher administrative costs due to jurisdictional election requirements. In turn, a political campaign may very well refuse a tiny donation, which could detrimentally affect future participation by a good-intentioned potential donor.

The present invention, as described above, solves this problem by first establishing a first escrow account for a first donor. Other escrow accounts also are established for other donors. The system of the present invention then removes funds from the first escrow account and additional escrow accounts upon instructions from the first donor and other donors, respectively. These instructions include having a transfer designation. The transfer designation serves to inform the system as to which political candidate should receive the donation. The system, meanwhile, compares the funds from these escrow accounts to a threshold donation level, which essentially is set to make a donation to a political candidate worthwhile in terms of reporting and accounting. At this point, the system of the present invention aggregates the funds of the first donor with the same transfer designations of the money from the other donors to equal or surpass the threshold donation level. What is created is a sum of funds, which is the aggregate of all this money designated to be transferred to a political candidate. In short, the sum of funds is donating the sum of funds to the transfer designation. This sum of funds is then transferred to the transfer designation and deposited with the political candidate.

Meanwhile, the present invention also publishes the sum of funds per donor and displays the geographic location of the first donor and the other donors. The rationale is described above in terms of competition and motivational aspects. But it should be noted that displaying the geographic location of the first donor and the other donors indicates the amount of the sum of funds that has been donated by the first donor and the other donors. The present invention also displays a message and also displays the sum of funds only received by the system after displaying the message. The present invention additionally displays messages from a candidate but also displays the sum of funds only received after displaying this message.

At the same time, the present invention registers the first donor and the other donors according to jurisdictional election requirements—which include election laws and procedures. Related to this, the present invention will report information about the first donor and other donors upon transferring the sum of funds. Because of the jurisdictional election requirements, particularly limits on donations each political candidate, the present invention will alert the first donor and other donors when the funds and money are nearing a pre-set limit. Typically, this pre-set limit will be based on the election laws of that jurisdiction.

Another way to describe the above system is to state that the present invention first obtains information from the individual donors in order to receive individual donations with the confined of jurisdictional election requirements. Again, the individual donations are each smaller than a political candidate's administrative costs to receive the individual donations within jurisdictional election requirements. Each individual donation is earmarked to a particular political candidate. Also as mentioned above, the present invention encourages the individual donors to make individual donations that are each smaller than a political candidate's administrative costs to receive the individual donations within jurisdictional election requirements. This is related to donation percentages and donation amounts that are broken down to various levels. This includes neighborhoods, districts, wards, city, county, state, province or country. The encouragement level includes political candidates posting a political stance. And as mentioned above, the system will aggregate the individual donations for the particular candidate from the individual donors into a sum of funds. Then the sum of funds will be transferred to that particular political candidate.

It is to be understood that everything not specifically explained is of conventional nature. The foregoing descriptions are not limited to the sole embodiment(s) described, but are within the scope of the following claims.

I claim:

1. A donation method, comprising:
   establishing a first escrow account for a first donor with a first threshhold on a programmed electronic computer;
   removing funds from the first escrow account upon instructions from the first donor, the instructions having a transfer designation and the instructions being a contribution;
   comparing the funds to a second threshold donation level to determine if the funds are great enough for a donation to be made on a programmed electronic computer;
   aggregating the funds with the same transfer designation with the money from other donors to equal or surpass the threshold donation level;
   creating a sum of funds;
   transferring the sum of funds to the transfer designation, said transferring the sum of funds is depositing said sum of funds with a political candidate or cause; and
   reporting information about the first donor and the other donors upon transferring the sum of funds, said reporting information is done within the confines of jurisdictional requirements.

2. The donation system method of claim 1, wherein said transferring the sum of funds is donating the sum of funds.

3. The donation system method of claim 1, further comprising publishing the sum of funds per donor.

4. The donation system method of claim 2, further comprising publishing the sum of funds per donor.

5. The donation system method of claim 1, further comprising displaying the geographic location of the first donor and the other donors.

6. The donation system method of claim 2, wherein said displaying the geographic location of the first donor and the other donors indicates the amount of the sum of funds that has been donated by the first donor and the other donors.

7. The donation system method of claim 1, further comprising displaying a message and displaying the sum of funds only received after displaying the message.

8. The donation system method of claim 7, further comprising displaying a message from a candidate and displaying the sum of funds only received after displaying the message.

9. The donation system method of claim 1, further comprising registering the first donor and the other donors according to jurisdictional election requirements.

10. The donation system method of claim 1, further comprising alerting the first donor when the funds are nearing a pre-set limit.

11. The donation system method of claim 1, further comprising alerting the other donors when the money is nearing a pre-set limit.

12. A donation system method, comprising:
    establishing a first escrow account for a first donor with a first threshhold on a programmed electronic computer;
    removing funds from the first escrow account upon instructions from the first donor, the instructions having a transfer designation and the instructions being a contribution;
    comparing the funds to a second threshold donation level to determine if the funds are great enough for a donation to be made on a programmed electronic computer;
    aggregating the funds with the same transfer designation with the money from other donors to equal or surpass the threshold donation level;
    creating a sum of funds;
    transferring the sum of funds to the transfer designation, said transferring the sum of funds is depositing said sum of funds with a political candidate or cause;
    reporting information about the first donor and the other donors upon transferring the sum of funds, said reporting information is done within the confines of jurisdictional requirements;
    further comprising publishing the sum of funds per donor;
    further comprising displaying the geographic location of the first donor and the other donors;
    wherein said displaying the geographic location of the first donor and the other donors indicates the amount of the sum of funds that has been donated by the first donor and the other donors;
    further comprising displaying a message and displaying the sum of funds only received after displaying the message;
    further comprising registering the first donor and the other donors according to jurisdictional election requirements;
    further comprising alerting the first donor when the funds is nearing a pre-set limit; and
    further comprising alerting the other donors when the money is nearing a pre-set limit.

\* \* \* \* \*